(12) United States Patent
     Ellis et al.

(10) Patent No.: US 8,160,910 B2
(45) Date of Patent:    Apr. 17, 2012

(54) VISUALIZATION FOR AGGREGATION OF CHANGE TRACKING INFORMATION

(75) Inventors: Jason B. Ellis, New York, NY (US); Laurent Hasson, New York, NY (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/236,224

(22) Filed: Sep. 19, 2011

(65) Prior Publication Data

US 2012/0010921 A1    Jan. 12, 2012

Related U.S. Application Data

(62) Division of application No. 11/505,145, filed on Aug. 15, 2006, now Pat. No. 8,024,214.

(51) Int. Cl.
    *G06Q 10/00*    (2012.01)
(52) U.S. Cl. .................................. 705/7.15; 705/7.13
(58) Field of Classification Search ................. 705/7.13, 705/7.15
    See application file for complete search history.

*Primary Examiner* — Thomas Mansfield
(74) *Attorney, Agent, or Firm* — Michael J. Buchenhorner; Vazken Alexanian

(57) ABSTRACT

A method within a system wherein a first user of the system provides information on social patterns to a second user includes: receiving a request for social pattern information from the second user, the request comprising a query; assigning authorization level to the second user for restricting the type and amount of data provided to the second user; providing information on social patterns to the second user according to the second user's authorization level; and storing information about the second user to be used in future transactions with the second user, the information including transactional fee data and subscription data for notifying the second user of additional social patterns as they develop.

18 Claims, 5 Drawing Sheets

100

| Type: | New | Date | 07272006 15:03 PM |

| Bug # | 20060373 | Priority | 2 | Severity | 2 |

| Software Module | Patient Admit | Detected in Build | 2.2 |

| Error Type | Coding - Wizard | Occurrence | Intermittent |

Summary: Patient Admit Screen does not accept seven-digit patient IDs from Memorial Hospital.

Error message: Invalid Patient ID

Note: see screenshot below

| Assigned to: | QA Team | cc to: | QA, Intake Grp, IT |
| Support: | See Screenshot below. |

Status: Open

*FIG. 1*

VISUALIZATION FOR AGGREGATION OF CHANGE TRACKING INFORMATION

CROSS-REFERENCE TO RELATED APPLICATIONS

This application is a division of, and claims priority from, U.S. patent application Ser. No. 11/505,145, filed on Aug. 15, 2006, incorporated by reference in its entirety herein.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to the field of change tracking systems.

BACKGROUND OF THE INVENTION

A change tracking system (CTS) is a software tool for tracking and managing changes in issues (customer feedback, trouble tickets) and/or bugs (hardware/software defects). It acts as a central repository, or database, of the issues and their related changes. This database can be accessed by users in a distributed environment. IBM® Rational® ClearQuest® is one such tool and there are many others, such as RMTrack and ikon Scorpion. The changes to be managed are termed "change requests." Each change request has a number of attributes such as the product it is filed against, the status of the change request (unconfirmed, assigned, resolved, etc.), who is assigned to work on it, severity, and more. A history is kept for each change request, which describes each change that has been made to it. While the CTS maintains a record of changes that have been made to change requests, it does not detect social patterns in that data. A CTS is an excellent tool for keeping track of issues, reporting on issues and detecting and reporting patterns in issues but it does not provide any information on the patterns in the resolution of the issues.

The IEEE (Institute of Electrical and Electronics Engineers) defines Software Configuration Management (SCM) as "the process of identifying and defining components in a system, controlling the release and change throughout the life cycle, recording and reporting the status of components and change requests, and verifying the completeness and correctness of system components." [IEEE-729] SCM systems provide a repository of code that comprises one or more software applications. Such systems maintain a version history for each file in the repository. The repositories provide the ability to manage and synchronize multiple simultaneous changes to the code by developers and multiple versions of each product.

While SCM systems maintain histories of source code changes, they do not maintain a history of the stimulus and/or process that goes along with those changes. This stimulus is recorded in the CTS. Combination CTS/SCM (CTSCM) systems integrate change tracking and software configuration management into one system. In such systems, each time a developer makes a change to the code, they indicate the stimulus for that change. Typically, this is done by indicating the change request that is being addressed during the code check-in process, for example, "Fix Bug 20488." Such linkages between systems are often referred to as "traceability" linkages. While CTS/SCM systems maintain traceability links among SCM and CTS systems, they do not derive social patterns from that historical data.

Orthogonal Defect Classification (ODC) is a software tool that analyses change requests, producing a mathematical model that can predict where new defects are likely to appear. Analysis of the ODC data is a valuable diagnostic method for evaluating changes and/or defects in software applications. In ODC, software developers attach additional attributes to change requests. These attributes enable ODC to produce a product profile. This profile can be used to generate an expected signature for the product going forward. When we see deviations from this expected signature in the future, we know we need to investigate further.

The above-described systems focus solely on managing the technology processes and have neglected the human component of the change tracking cycle. With non-transactional processes such as issue management, people interact and collaborate via e-mail, LANs or the Internet to influence the process. The social interaction among these users of a change tracking system can have an impact on how expediently issues are resolved.

Therefore, there is a need for a system to overcome the aforementioned shortcomings by bridging the gap between the technological and the social issues affecting change tracking

SUMMARY OF THE INVENTION

According to another embodiment, a computer-implemented method of the system includes steps or acts of: receiving as input change request data history; detecting social patterns in the change request data history; storing information about the social patterns, including status history data; and providing information on social patterns within the status history of the given change request.

In another embodiment of the present invention, a user of a computer-implemented transactional method within a system provides information on social patterns to a second user. The transactional method includes the following steps: receiving a request for social pattern information, in the form of a query, from the second user; assigning an authorization level to the second user for restricting the type and amount of data provided to the second user; providing the requested information to the second user; and storing information about the second user for future transactional purposes, the information including transactional fee data and subscription data, the subscription data for notifying the second user of additional social patterns as they are developed.

BRIEF DESCRIPTION OF THE DRAWINGS

The following detailed description of an exemplary embodiment describes the foregoing and other exemplary purposes, aspects, and advantages of the invention with reference to the drawings, in which:

FIG. 1 is a simplified illustration of a bug report shown as an example of a change request, according to the known art.

DETAILED DESCRIPTION

An embodiment of the invention provides a method for identifying patterns in changes in the status of a given issue. These patterns can indicate a problem a given community has in resolving a given issue. We refer to these as "Social Patterns." Issues may comprise customer feedback, customer complaints, task assignments, trouble tickets, or hardware/software bugs. For simplicity, we focus our discussion on change tracking systems for software bug reporting, although other change tracking systems can benefit from embodiments of the present invention.

There are numerous bug tracking software products available yet they all function in a similar manner. The software comprises a database for the storage of, changes to, and retrieval of, bug reports. Bug reports are change requests filed by users (data entry personnel, software developers, managers, quality assurance engineers) reporting a particular problem encountered with a software product. The bug tracking software often utilizes an e-mail function to communicate information about a bug report.

FIG. 1 shows a simplified illustration of a bug report 100 showing elements common to many bug reports. The bug report 100 of FIG. 1 shows what data the bug reporter should provide in a typical bug report. In the example of FIG. 1 the bug report 100 reports a new bug discovered when entering patient information for a hospital. In the bug report 100 the user provides the type of change request to be processed. Possible types are "New" for a newly opened bug report, "Edit" for an existing bug report, and "Close" to close a bug report. The bug report 100 must always include a date of creation of the report because this data is critical for change tracking and history purposes. Normally the date is automatically entered by the software. The bug number assigned to this bug report 100 is also automatically entered by the software. Next the user must indicate the priority and severity of the bug. The assigned priority and severity indicate how critical the error is and how much of an impact the error has on the system. For example, a bug with a high priority and severity may stop a software product from shipping.

Some information about the software causing the error needs to be entered, such as the software module and the build number. The user should always provide a summary of the bug. The summary should be as detailed as possible and should include the error message, if any, and screenshots, if applicable. Proper bug reporting is a skill in and of itself and requires that users be properly trained. Improper bug reporting could present problems later on. The bug also needs to be assigned to a person or group for handling and also the bug report 100 should contain names and/or e-mail addresses of individuals or groups who should receive the bug report 100 and any updates. The status of the bug report 100 is also an important element. Possible entries for status are: "Open," "In Progress," and "Fixed."

Figure 2:
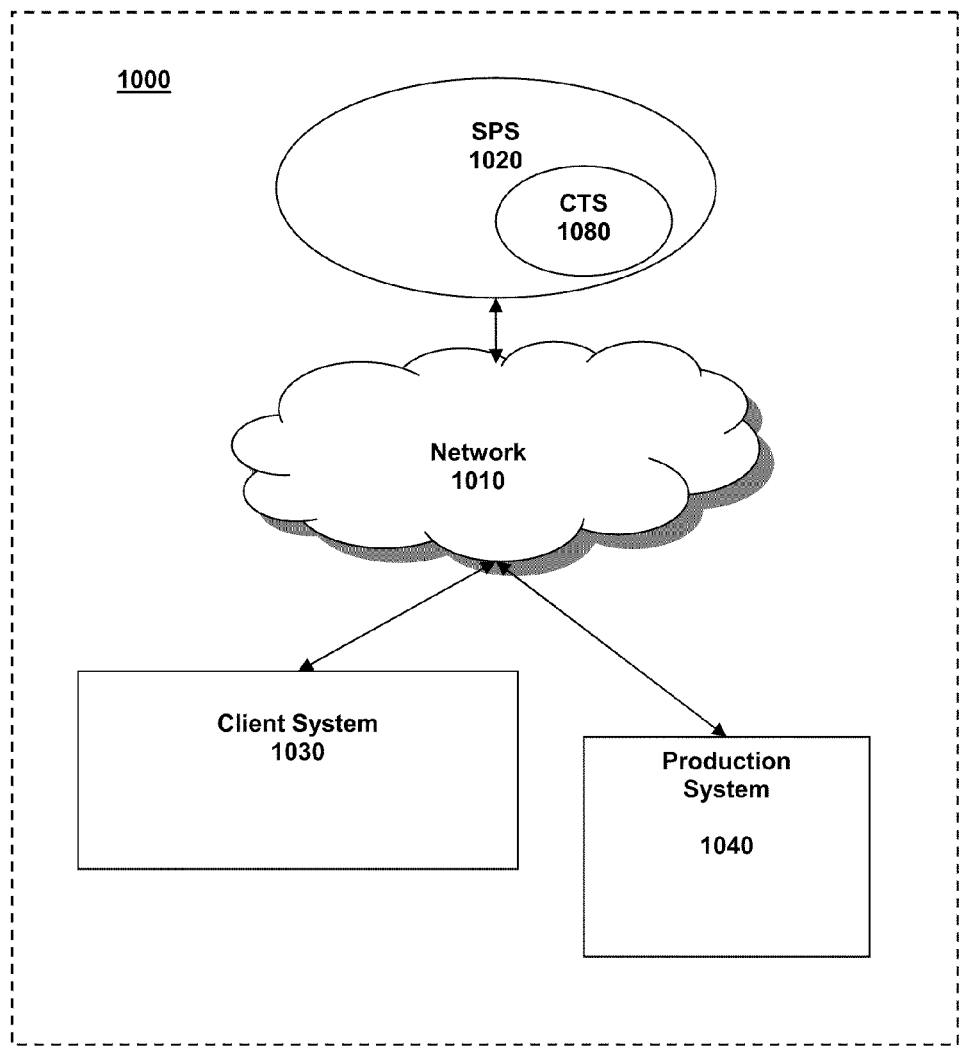
FIG. 2 is a simplified block diagram of an example of a network topology that supports an embodiment of the invention.

Referring to FIG. 2, there is shown an example of a System 1000 according to an embodiment of the invention. In this System 1000 a Social Pattern Server 1020 is connected to a network 1010 through any commonly available network I/O interface. The Social Pattern Server 1020 operates as a service provider to the Client Software 1030, which uses data from the Social Pattern Server 1020 to provide additional services. The Production System 1040 is the source of the data the Social Pattern Server 1020 uses (e.g., change requests). The Social Pattern Server 1020 interfaces with the network 1010 which can be a Local Area Network (LAN) or it can be a Wide Area Network (WAN) such as the Internet. Communication between the Social Pattern Server 1020 and the Client Software 1030 and the Production System 1040 is bi-directional and optionally occurs over a network. In an alternative embodiment, the Social Pattern Server 1020, the Client Software 1030 and the Production System 1040 are all located within the same network and may be part of the same physical system.

The Social Pattern Server 1020 receives data from the Production System 1040 regarding software code changes in the form of change tracking data (e.g. descriptions of proposed changes to software code). The Social Pattern Server 1020 stores a status history of the change tracking data. The raw status history data the Server 1020 stores must be "interpreted" by a Social Pattern Detection Handler (see discussion of FIG. 3) in order to provide information about the social process that surrounds the changes to the code rather than the changes to the code themselves (changes to the code are handled within the Production System 1040). Interpreting the data comprises parsing the elements of the change request, focusing on the history of the changes, and analyzing the parsed data. Analyzing the data comprises applying formulas to the data according to user-defined pattern operational descriptors, and then running comparisons to other related issues and their historical data. The output of the Server 1020 is an indication of what social patterns occur for each change request and in what amount.

The Server 1020 includes a change tracking system (CTS) and maintains traceability linkages between that data and the social patterns that result from the analysis. Some examples of the social process surrounding the change events could be: how often and who is commenting on a change event; how long a change event remains in the same status; what is the time lapse between a communication from a user and a change in the status of an event.

Both the orthogonal defect classification tool and the Social Pattern Detection Handler take histories as input. However, the histories are fundamentally different. ODC takes a classification of change requests as input, that is, each change request is categorized in a variety of ways and then mathematically analyzed. An embodiment of the present invention takes the histories of individual change requests as input and analyzes the histories from a social interaction perspective. For example, assume that bug 100 was opened, resolved, and closed, with numerous updates in between. From those updates, the system 1000 according to a preferred embodiment would extract historical information such as: How long before the bug was resolved? How often was it reassigned and to whom? How many users contributed comments to the report and which departments are they in? How many times was the cc list updated? How many times was the priority of the bug report 100 changed? How often was the bug status changed? How closely did bug status changes follow input from those on the cc list? Were there members of the cc list who did not comment on the bug report 100? Note that the change request history can be analyzed at any time during the life of the bug report 100; the analysis is not limited to post reporting implementation.

The outputs of the System 1000 are fundamentally different from the outputs of known systems. The output of the mathematically-oriented ODC tool is a process signature that predicts where future defects in software coding can be expected, while the output of the System 1000 is an indication of what social patterns occur for each change request and in what amount. Continuing with the bug report 100 example, after analyzing the historical data surrounding the changes to the bug report 100, the following social patterns may emerge:

How long before the bug was resolved? A pattern may indicate that this bug took thirty percent more time to resolve than other bugs of the same priority and severity.

How often was it reassigned and to whom? A pattern may indicate that bug reports for this particular software module are often reassigned. This may indicate that the user group creating the bug report is entering the wrong information initially and may need training, or perhaps a QA (quality assurance) team is too busy to handle the additional workload and is reassigning the bug to another group.

How many users contributed comments to the report and which departments are they in? A high degree of interest in a bug report would seem to indicate that this particular bug is important to a certain group, regardless of its priority level.

How many times was the cc list updated? A pattern may indicate that the bug reporters do not have the appropriate information as to who should receive the bug reports; some training may be indicated.

How many times was the priority of the bug report 100 changed? Again a pattern may indicate that the bug reporters are not properly trained. Information about the changes themselves could be significant, such as whether a priority level was increased or decreased.

How often was the bug status changed? A bug report which has been resolved, then closed, then re-opened requires some attention. A pattern may indicate that the list of personnel who have the authority to close a bug report should be re-examined.

How closely did bug status changes follow input from those on the cc list? A pattern may indicate that input from members of the cc list is directly correlated to quick activity on the bug report. We may learn that the software developers working to fix the bug respond more quickly when someone from the cc list shows an interest in the report.

Were there members of the cc list who did not comment on the bug report 100? A pattern may indicate that certain members of the cc list never exhibit any interest in bug reports. This may indicate that the cc list should be updated to remove those individuals.

Figure 3:
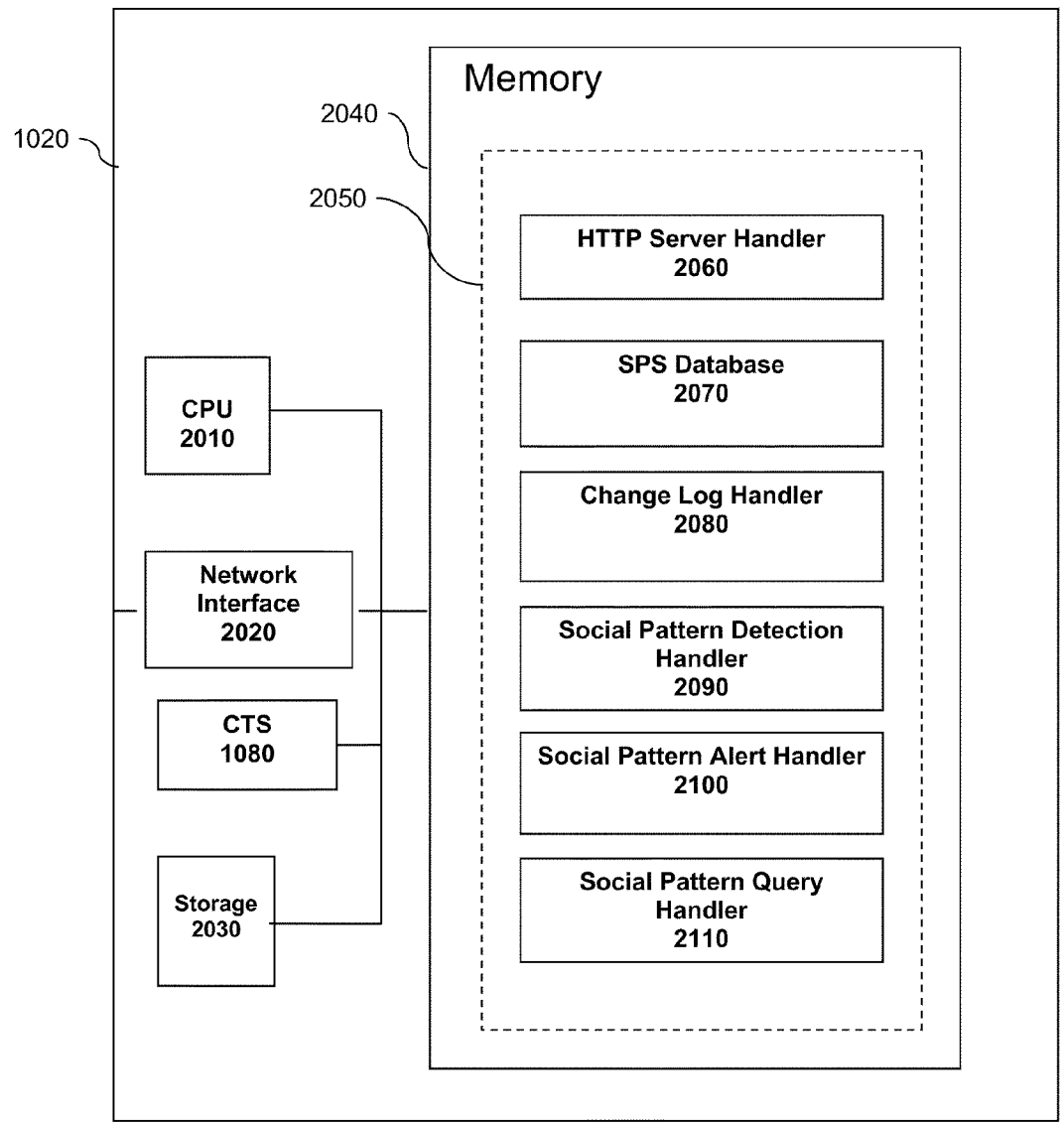
FIG. 3 is a high level block diagram showing an example of a component block diagram of the social pattern server.

Referring to FIG. 3, there is shown the Social Pattern Server 1020 which is a computer including all the components of a typical computer system, such as a central processing unit 2010, a network interface 2020 for accessing the network 1010, a hard disk storage system 2030, and random access memory 2040. In addition, the Social Pattern Server 1020 has logic 2050 loaded into the random access memory 2040 and accessed by the Central Processing Unit 2010. The logic 2050 includes:

HTTP Server Handler 2060—This is a hypertext transfer protocol server that handles requests for social pattern information from the network 1010.

SPS Database 2070—This is the social pattern server database. It stores social pattern information resulting from the analysis of change requests. For each discovered pattern this information includes, but is not limited to, indications of: a) the type of pattern; b) when the pattern began and, if available, ended; c) the one or more users involved in each given pattern; d) the data involved; e) the id of the affected project or job; and f) the ID of the manager(s) supervising the relevant project or job when the pattern occurred. The SPS Database 2070 not only enables the persistent storage of such information, but handles queries over the current data. It is from here 2070 that the Social Pattern Query Handler 2110 retrieves the data it returns in response to posed queries. The Database 2070 also maintains an issue/pattern association history. Issue/pattern associations can be digitally signed—including across both the issue description and pattern ID data so as to block future denial of a given association.

Change Log Handler 2080—This provides access to raw change request data, which is analyzed in order to detect patterns. This handler 2080 could include a standard change tracking system, such as the IBM® Rational® ClearQuest® change tracking system product. The Change Log Handler 2080 runs on the Social Pattern Server 1020 and is invoked whenever a change is reported by the production system 1040 or the CTS 1060. The Handler 2080 not only stores change tracking data, but provides access to this data to the other Social Pattern Server 1020 handlers (Social Pattern Detection Handler 2090 and Social Pattern Alert Handler 2100). The main difference between the Change Log Handler 2080 and the Database 2070 is that the Handler 2080 stores the raw data and the Database 2070 stores the pattern data, which is the raw data after it has been analyzed.

Social Pattern Alert Handler 2100—using data in the Database 2070, the Social Pattern Alert Handler 2100 determines if a user or users should be alerted and, if so, what sort of alert should be provided, and then formulates the alert. The alert may consist of an e-mail message or any other viable communication method. The alert may notify a manager that a high-priority bug was opened a month ago and yet there has been no action taken from his department. The alert may provide information about the bug report at issue and also information about the patterns associated with that report. The alert may take the form of a notification to a user that the system 1000 has detected that another user is associated with a certain issue.

Social Pattern Query Handler 2110—allows for arbitrary querying of the Database 2070 by external services. According to an embodiment of the present invention, these services may include applications that create, send and process the returned results from the HTTP-based requests of the Social Pattern Query Handler 2110 via the HTTP Server Handler 2060. A user of the system 1000 can subscribe to the Social Pattern Server 1020 for notifications related to one or more patterns or one or more issues, through interaction with the Social Pattern Query Handler 2110. Allowing external services to access the Query Handler 2110 opens up the possibility of charging outside parties for queries. One with regular skill in the art will appreciate that applications may communicate with this Handler 2110 via simple socket-based network applications within the scope of the current invention.

Social Pattern Detection Handler 2090—detects social patterns in raw change request data from the Change Log Handler 2080 and stores the results in the Database 2070. The Handler 2090 detects the social patterns by scanning the data and applying the user-defined pattern operational descriptions. The results include the following for each change request X: set of patterns that are seen on X, a magnitude for each pattern seen on X, and a combined magnitude for all the patterns seen on X. Operational descriptions of some example patterns that may be detected, and the methods for detecting them, are as follows:

Assign/reassign pattern. Do the following for each change request: Search the change request's history for state changes to an Assigned state, Reassigned state, or similar. The total of these state changes is the Assign/Reassign score for the change request.

Resolve/reopen pattern. Do the following for each change request: search the change request's history for state changes to a Resolved state or similar. The total of these state changes is the Resolve/Reopen score for the change request.

Popularity pattern. Do the following for each change request: search the change request's history and count the number of comments, votes, duplicates of the change request, and people added to the cc list of the change request. The total of these modifications is the Popularity score for the change request.

Blocking pattern. Do the following for each change request: count the change requests that depend on this change request. The total of these dependent change requests is the Blocking score for the change request.

Zombie pattern. Do the following for each change request: search the change request's history for the most recent activity on the change request. Subtract the date of that activity from the current date and we get the zombie score for the change request.

Unevaluated patch pattern. Do the following for each change request: count the patches that have not been evaluated for the change request. The total of these unevaluated patches is the Unevaluated Patch score for the change request.

Age and Severity pattern. Do the following for each change request: subtract the change creation date for the change request from the current date and get the Age of the change request. If necessary, convert the severity of the change request so that it is on a scale from 0 to S where 0=lowest severity and S=highest severity and S>0. Call this new severity SeverityNew. Multiply Age by SeverityNew and we have the Age & Severity score for the change request.

The System 1000 not only provides the patterns associated with issues and/or users, it can further provide a suggested cause for the difficulty in resolving a given issue based on its associated pattern. For example, a Zombie issue may be caused by the fact that a given issue's severity rating is less than that of newly added issues. This may indicate that bug reporters are now purposely selecting a higher priority for their bug report than the bug merits. Perhaps they are not satisfied with the length of time until resolution of a bug and this is one way to bypass a bottleneck of which the manager was unaware. It is important to note that one pattern may encompass one or more other patterns. The Age and Severity pattern, the Unevaluated Patch pattern and the Zombie pattern could all be part of some other pattern related to length of time. Patterns may be combined according to characteristics, such as elapsed time, priority, amount of changes, etc.

One with regular skill in the art will appreciate that the SPS Database 2070 may also store specifications (or even source code) for each of these social patterns. Given this configuration, the Social Pattern Detection Handler 2090 could load each of these operational descriptions when invoked, checking for patterns to complete its search. One with regular skill in the art will also appreciate that, given this configuration, the Social Pattern Detection Handler 2090 could be made to check for a new pattern simply by adding the operational description of the new pattern.

Figure 4:
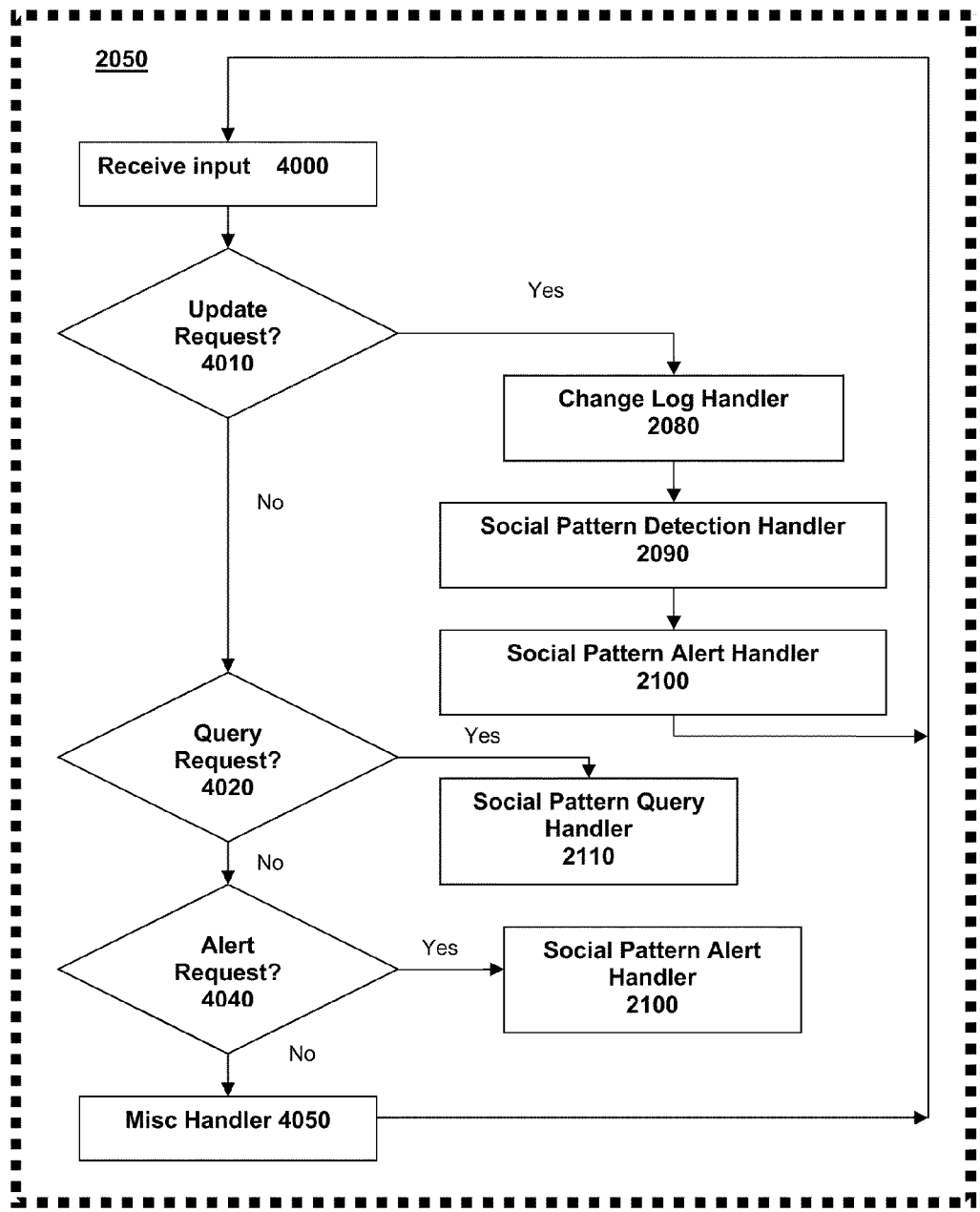
FIG. 4 shows an example of the logic flow of the Social Pattern Server.

Referring to FIG. 4 we discuss the operation of the Social Pattern Server logic 2050. The Server 1020 is preferably positioned at the front-end of the client system to intercept incoming requests. It will handle all change requests and queries for social pattern data and will re-route other requests. This means that all change requests are routed through the Social Pattern Server 1020; therefore it becomes an augmented change server. As shown in the flowchart of FIG. 4 the process begins at step 4000. The Social Pattern Server 1020 waits for requests. In step 4000 the Server 1020 has received a request. When the request arrives in step 4000 the server 1020 first determines in step 4010 if it is a request to update the change log. If it is, the Change Log Handler 2080 is called to store the new change data. Next the Social Pattern Detection Handler 2090 is invoked to detect patterns in the newly updated change request data. Any such results are then provided to the Social Pattern Alert Handler 2100, which determines if an alert should be raised and, if so, what form it should take. Following this, control is returned to step 4000 where the Server 1020 will receive the next request.

If the request is not an update request, then step 4020 determines whether it is a query request. If so, the Social Pattern Query Handler 2110 processes the query and sends the results to the requester, possibly after invoking the HTTP Server Handler 2060 if it is a network request. Processing then resumes at step 4000.

If the request is not a query request, then step 4040 determines whether it is a request to specify or delete an alert. If so, the Social Pattern Alert Handler 2100 is passed the request and the handler 2100 modifies its alert subscription list appropriately (i.e., either adding or deleting a subscription to have an alert sent when a given pattern is detected). Processing then resumes at step 4000.

If the request is not an alert request, then the request is routed to a miscellaneous handler 4050 because at this point it has been determined that the incoming request is not an update request, a query, or an alert request; therefore the Social Pattern Server 1020 is not invoked. The miscellaneous handler is whatever client system handles other request types. The miscellaneous handler 4050 could be a separate client system server or it may be a server linked with the Social Pattern Server 1020. After routing the request, processing returns to step 4000.

The SPS Database 2070 may also perform ranking of issues, based on their respective pattern or patterns. For example, assume that a user of the system has determined that the Age and Severity Pattern is more important than other detectable patterns. The SPS Database 2070 would place a higher rank on issues based on the Age and Severity Pattern associated with those issues. At any given time there may be a multitude of issues a manager needs to be aware of. Ranking issues assists the manager in prioritizing his work so that the most important (highest rank) issues are dealt with first. The Database 2070 may also provide a ranked list of users, the ranking based on the patterns associated with each of the users. The ranking may be based on patterns chosen by a manager, such as "average length of time to resolve an issue."

In addition to ranking an issue, the SPS Database 2070 provides a multi-dimensional characterization of a given issue that comprises an indication of the one or more patterns related to the issue. A user of the system may simply want to query a certain issue on a very superficial level. On the other hand, a user may want substantial information on the issue, including any and all patterns associated with the issue and perhaps a comparison of that issue with other related issues.

In one embodiment of the present invention, the Social Pattern Server 1020 may effect changes on the issues themselves, not just report on the patterns surrounding the issues. For example, through interaction with the Change Tracking System 1060, the Server 1020 could reset the priority/severity of a given bug (change request) based on its related pattern. Assume a bug report with a low priority/severity indicator blocks the resolution of another bug report with a high priority/severity indicator. This could be because the low priority bug report must be completed before the higher priority bug report can be worked on. The Server 1020 could increase the priority/severity of the low priority bug report so that it gets resolved quickly. In this embodiment, the Server 1020 would first alert a user of the system about the blocking pattern detected and request authority to change the priority/severity of the bug report. In the alternative, the Server 1020 could make the change without seeking authority and notify the user when the change has been made.

The Service Provider/Client Relationship.

According to another embodiment of the invention, the System 1000 can be enabled to provide the above-described functions as a service to a user outside of the System 1000, perhaps for a fee. In this embodiment, a user of the System 1000 would allow a second user (a client) to access the Social Pattern Server 1020 over the network 1010 to submit queries and/or to receive social pattern data regarding the client's change requests. The client may subscribe to the System 1000 in order to receive alerts and to be informed of newly-developed social patterns which may be of interest to the client.

The authorization level assigned to the client could be used to limit the number and type of queries the client is allowed to submit to the System 1000. The client may be charged for the services on a per query basis, or by subscription. The client may additionally contract the user of the System 1000 to provide customized social patterns applicable to the client's change requests if they are different from those in the Change Tracking System 1060. This customized service could be performed on a fee basis. A person with knowledge in the art will appreciate that there are many different transactional scenarios possible for an embodiment where the Server 1020 provides services (whether for a fee or not) to a client of the System 1000.

Graphical User Interface (GUI).

Information is of little use if a person cannot easily access it and manipulate it to an advantage. For this reason a GUI is used as the user interface in a preferred embodiment of the present invention.

Figure 5:
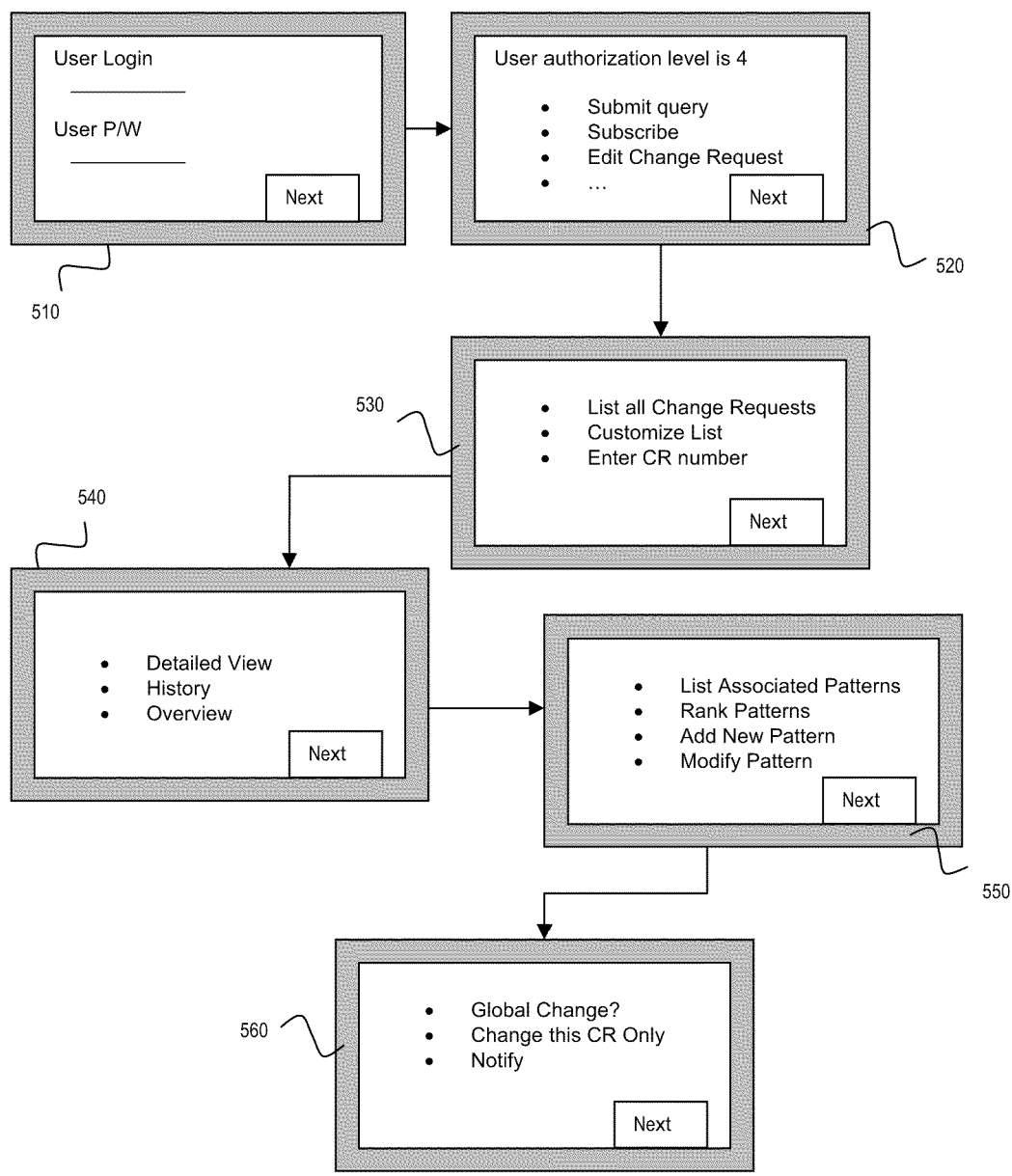
FIG. 5 shows a simplified diagram of Graphical User Interface screens according to an embodiment of the invention.

Referring to FIG. 5 there is shown a possible, simplified sequence of user interaction with a GUI according to an embodiment of the present invention. In order to initiate a session with the Social Pattern Server 1020, a user is first shown a screen 510 prompting a user to log in and submit a verifiable password. Once the user submits this information and it is determined to be correct, the next screen 520 displays the user's authorization level. Different users may have different authorization levels in order to prevent unauthorized access to sensitive information. This screen 520 also allows the user to select what functions to perform. Some examples are: "submit query," "subscribe," and "edit change request." For this example, assume the user has chosen "submit query."

Possibly the next screen 530 prompts the user to choose a method of CR selection. "List all Change Requests" will display an ordered list of all change requests for which the user has read/write authorization. To select one of the CRs the user can highlight a CR number and hit the Enter key. The "Customize List" selection will allow the user to narrow down the list of CRs (e.g., by department, by application, etc.). "Enter CR number" is the simplest choice wherein the user inputs the CR number, if known.

Once a CR is chosen for the query, another screen 540 allows the user to choose a method of viewing the data, from an overview to a more detailed view or perhaps a history view. The user will be able to toggle from one view to another. Screen 550 prompts the user to choose what function to perform on a pattern or patterns with respect to the selected CR. Assume the user has chosen to add a new pattern. The next screen 560 prompts the user to choose to add the new pattern to the selected CR only, or to make the new pattern global. Also the user may elect to notify other users of the new pattern selection. Note that adding a new pattern is easily done by adding the operational description of the new pattern into the Social Pattern Detection Handler 2090.

The GUI interface will also facilitate user access to all of the issue/pattern associations in the Database 2070, as well as facilitating access to the other users of the system. A user will be able to view which users are associated with which issues and which patterns (if authorized). The GUI will display current data because the system dynamically updates the Database 2070 with any changes. If the user makes a change or an addition to the Database 2070, that change or addition will be immediately available for view by all authorized users. The above description of the GUI is just one example of how a user can interact with the Social Pattern Server 1020 and should not be taken to be the full scope of the GUI embodiment. Those with knowledge in the art will understand that many different GUI representations are possible.

Therefore, while there have been described what are presently considered to be the preferred embodiments, it will be understood by those skilled in the art that other modifications can be made within the spirit and scope of the invention.

We claim:

1. A computer-implemented transactional method within a system wherein a first user of the system provides information on social patterns to a second user, the transactional method comprising steps of:
   using an input/output interface for receiving a request for social pattern information from the second user, the request comprising a query;
   using a processor device configured to perform:
      assigning an authorization level to the second user for restricting a type and amount of data provided to the second user;
      providing information on social patterns to the second user according to the second user's authorization level;
      wherein the social patterns indicate a problem a community has in resolving an issue and comprise customer feedback, customer complaints, task assignments, trouble tickets, zombie scores, and hardware and software bugs;
      wherein a zombie score is calculated by searching a change request history for a most recent activity on the change requests and subtracting a date of that activity from a current date; and
      storing information about the second user to be used in future transactions with the second user, the information comprising transactional fee data and subscription data, the subscription data for notifying the second user of additional social patterns as they develop.

2. The computer-implemented transactional method of claim 1 wherein a zombie score is calculated by searching a change request history for a most recent activity on the change requests and subtracting a date of that activity from a current date.

3. The computer-implemented transactional method of claim 1, wherein the social patterns further comprise: an assign/reassign pattern, a resolve/reopen pattern, a popularity pattern, a blocking pattern, a zombie pattern, an unevaluated patch pattern, and age and severity patterns.

4. The computer-implemented transactional method of claim 1, wherein the providing step comprises alerting the second user of the system that a social pattern has been detected.

5. The computer-implemented transactional method of claim 2, further comprising a step of: maintaining traceability linkages to change tracking systems to track changes in the status history of change requests.

6. The computer-implemented transactional method of claim 2 wherein the change requests are trouble tickets.

7. The computer-implemented transactional method of claim 2 wherein the information on social patterns further comprises: a set of patterns that are presented on the change request, a magnitude for each pattern presented on the change request, and a combined magnitude for all the patterns presented on the change request.

8. The computer-implemented transactional method of claim 7 further comprising a step of ranking change requests based on information about one or more social patterns associated with the change requests.

9. The computer-implemented transactional method of claim 2 further comprising a step of: modifying one or more change requests based on information about one or more social patterns associated with the one or more change requests.

10. The computer-implemented transactional method of claim 3 further comprising detecting the assign/reassign pattern by: for each change request: searching the change history for state changes to an assigned state, reassigned state, or other state; and totaling the state changes to generate an assign/reassign score for the change request.

11. The computer-implemented transactional method of claim 3 further comprising detecting the resolve/reopen pattern by: for each change request: searching the change request's history for state changes to a resolved state or similar state; and totaling the state changes to generate a resolve/reopen score for the change request.

12. The computer-implemented transactional method of claim 3 further comprising detecting the popularity pattern by: for each change request: searching the change request's history; counting modifications such as: a number of comments, votes, duplicates of the change request, and people added to a circulation list of the change request; and totaling the modifications to generate a popularity score for that change request.

13. The computer-implemented transactional method of claim 3 further comprising detecting the blocking pattern by: for each change request: counting change requests that depend on this change request; totaling the dependent change requests to generate a blocking score for the change request.

14. The computer-implemented transactional method of claim 3 further comprising detecting the zombie pattern by: for each change request: searching the change request's history for a most recent activity on the change request; and subtracting a date of that activity from a current date to generate a zombie score for the change request.

15. The computer-implemented transactional method of claim 3 further comprising detecting the unevaluated patch pattern by: for each change request: counting the patches that have not been evaluated for the change request; and totaling the unevaluated patches to generate an unevaluated patch score for the change request.

16. The computer-implemented transactional method of claim 3 further comprising detecting the age and severity pattern by: for each change request: subtracting a change creation date for the change request from a current date to generate an age of the change request; and multiplying the age by a severity of the change request to generate the age and severity score for the change request.

17. The computer-implemented transactional method of claim 1 wherein providing the information on social patterns to the second user is done on a fee basis.

18. The computer-implemented transactional method of claim 1 wherein providing the information on social patterns to the second user is done on a subscription basis.

* * * * *